United States Patent Office 3,154,898
Patented Nov. 3, 1964

3,154,898
SKIN PACKAGING
Earl F. Engles, Jr., Midland, Mich., assignor to The Dow Chemical Company, Midland, Mich., a corporation of Delaware
Filed Aug. 1, 1962, Ser. No. 213,938
9 Claims. (Cl. 53—30)

The present invention relates to plastic skin packaging, and is more particularly concerned with a method of making water impervious non-curling, skin packages without using adhesives; and with articles made by the method of this invention. This is a continuation-in-part of application Serial No. 9,309, filed February 17, 1960.

Conventional skin packages which utilize a paper board backing are not water impervious, tend to curl under stress, and require the use of an adhesive to secure a firm bond between the backing and the film overlay.

It has now been found that a generally moisture-proof, non-curling and strongly bonded skin package can be obtained by using as a backing material a non-porous foamed plastic which is compatible with the film overlay.

Foamed plastics which have a surface corresponding to that obtained by slicing through a foamed body having an average cell size of from about 0.1 mm. to about 10 mm., preferably from about 0.5 mm. to about 1.0 mm. are especially useful. Backing materials having a smooth surface are not strongly bonded to the film overlay. Backing materials having larger cell sizes tend to melt and deform somewhat during the packaging operation.

Backing materials which are suitable include foamed polystyrene and other foamed thermoplastic alkenyl aromatic resins, foamed polyethylene, foamed polyvinyl chloride, and the like. Foaming-in-place bead foams or melt extrusion foams can be used, as desired. The foam can be of any desired thickness, but is preferably at least ⅛ inch thick in order to have the appropriate strength.

The film overlay used must be compatible with the foam backing, for example, when a polyethylene foam is used, a polyethylene film should be used as the overlay, when an alkenyl aromatic resin foam backing is used, an alkenyl aromatic resin film overlay should be employed, and the like.

By an "alkenyl aromatic resin" is meant a solid polymer of one or more polymerizable alkenyl aromatic compounds. The polymeric resin comprises in chemically combined form at least 50 percent by weight of at least one alkenyl aromatic compound having the general formula:

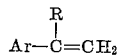

wherein Ar represents an aromatic hydrocarbon radical, or a nuclear halo-substituted aromatic hydrocarbon radical, of the benezene series, and R is hydrogen or the methyl radical. Examples of such alkenyl aromatic resins are the solid homopolymers of styrene, α-methylstyrene, ortho-methylstyrene, meta-methylstyrene, para-methylstyrene, ar-ethylstyrene- ar-vinylxylene, ar-chlorostyrene, the solid copolymers of two or more of such alkenyl aromatic compounds with one another; and solid copolymers of one or more of such alkenyl aromatic compounds with minor amounts of other readily polymerizable olefinic compounds such as divinylbenzene, methylmethacrylate, acrylonitrile, etc.

The plastic skin packages of the present invention may be made in conventional vacuum forming apparatus, in the conventional manner, with the exception that no adhesive is required to form strongly bonded products. The film overlay can be clear, to allow ready inspection of the packaged article, or translucent as desired. Although films having a thickness of from about 5 to about 20 mils, can be used, films having a thickness of about 10 mils are preferably employed.

Since many of the more desirable thermoplastic foamed backings are generally non-porous because of their closed cell structure, it has generally been a problem, in the past, to heat seal a compatible plastic film to the foam while simultaneously providing for the drawing of a vacuum from between the film and the foam. Such elaborate measures as providing holes or channels through the foam backing generally were included in prior processes to provide for the drawing of a vacuum. British Patent 784,503 and U.S. Patent 2,806,812 typically illustrate such prior processes. Sometimes such processes even included ways of later filling up or otherwise sealing up the holes or channels after the vacuum was drawn. Almost needless to say, these steps of providing holes, channels or the like in the foam backing material, and even later reclosing them on occasion, consumed time and effort.

Accordingly, it is an object of the present invention to provide a simpler and more economical process for plastic skin packaging on thermoplastic foam backings. More particularly, it is an object of the present invention to provide a process for plastic skin packaging on thermoplastic foam backings which are generally non-porous and heat shrinkable, this alleviating the prior necessity of providing holes, channels or other like ways for the drawing of a vacuum between a film skin and the foam backing as they are being united.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several figures thereof, and in which.

It has been discovered that it is not necessary to channel or otherwise form air escape passages in a foam backing for vacuum drawing in forming skin packages, where the backing is of the thermoplastic, closed cell or non-porous, heat shrinkable variety. Such foams include those previously described as, for example, polystyrene foam, polyethylene foam and polyvinyl chloride foam. The process of this invention can be most easily understood by reference to FIGURES 1 to 3.

Figure 1:
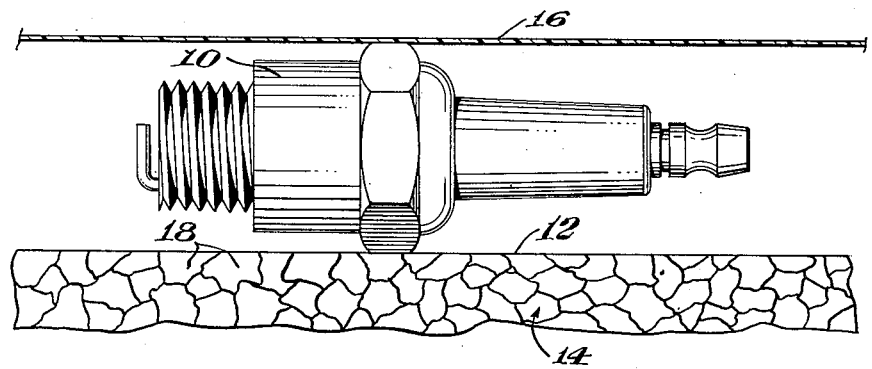
FIGURE 1 is a side elevational view, partially in section, of an article about to be packaged between a film skin and a foam backing, illustrating one step of the present invention.

Referring more particularly to FIGURE 1, an article 10, to be packaged, is placed on a relatively smooth scrface 12 of a closed cell, heat shrinkable thermoplastic foam backing 14. A plastic film skin 16, compatible with the foam backing 14 and which has been preheated to its softening point, is then brought down over the article 10 and towards the backing 14.

Figure 2:
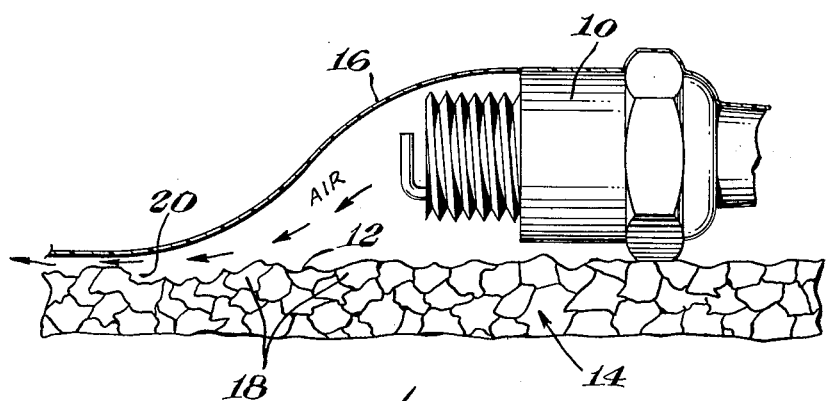
FIGURE 2 is a view similar to FIGURE 1, with parts broken away, only illustrating a subsequent step of the present invention.

FIGURE 2 illustrates the drawing of a vacuum, that is removal of air from between skin 16 and backing 14, as the heated skin approaches the surface 12 of the backing. However, the surface 12 has now started to roughen due to the proximity of the skin 16 and the heat radiating therefrom, the degree of roughening or unevenness increasing as the skin comes closer to the surface 12. It is believed that this roughening of surface 12 provides passageways 20 for the air to escape between the skin 16 and backing 14 just before and probably even as they become engaged around the periphery of article 10.

It appears that the individual cells 18 of the foamed backing 14 comprise biaxially stretched film walls which characteristically shrink when sufficient heat is provided. In this case, the heat radiated from the film skin 16 as it approaches the upper layer or layers of cells 18 is sufficient to heat shrink these cells to cause the resulting roughness or unevenness in the surface 12 permitting the drawing of a vacuum through irregular passageways 20 extending in a plurality of diverse directions throughout that surface.

Figure 3:
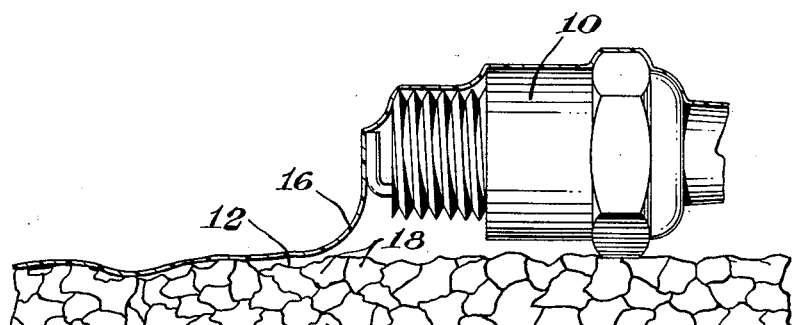
FIGURE 3 is a view similar to FIGURE 1, with parts broken away, only illustrating the final step of the present invention.

In FIGURE 3, the sealing of the skin 16 with the upper surface 12 of the foam backing around the periphery of article 10 is illustrated and provides a superior package ready for shipment and sale.

The present invention may be better understood but is not to be construed as limited by the following examples:

*Example I*

A spark plug was placed on a sheet of foamed polystyrene 3 in. x 4 in. x ½ in. in a Zack Industries vacuum former Model No. 10125, and a 10 mil film of biaxially oriented polystyrene was placed in position for vacuum forming.

The space between the film and foam backing was evacuated after the film had been radiantly heated to its softening point, i.e., between about 290° to 320° F. The film was solidly bonded to the foam backing making a firm, water-impervious, non-curling package. The experiment was repeated with foamed polystyrene backings having average cell sizes of from about 0.1 to about 10.0 mm. with similar results.

*Example II*

Following the procedure of Example I, with the exception that temperatures of 230° to 270° F. were employed, packages having foamed polyethylene backs and polyethylene film overlays were prepared containing pencils, tools, jewelry, etc. Results were similar to those of Example I.

*Example III*

The above experiments were repeated using a foamed backing of polyvinyl chloride and a polyvinyl chloride film with temperatures of 275° to 300° F. with similar results.

The skin packages of the present invention are further illustrated by the attached drawing wherein one modification of such packages is shown in schematic form.

While certain representative embodiments and detail have been shown for the purpose of illustrating the invention, it will be apparent to those skilled in the art that various changes and modifications can be made therein without departing from the spirit and scope of the invention.

Accordingly, what is claimed as new is:

1. A method of packaging an article, said method comprising the steps of placing the article on a generally heat shrinkable foamed backing, heating a film skin compatible with said backing to a temperature sufficient to soften said film, shrinking at least a portion of the surface cells of said backing through the use of heat, drawing a vacuum from between said film and said backing to bring said film around and over said article and adjacent said backing generally around the periphery of said article, and maintaining said vacuum until said skin is heat sealed to said backing where they engage one another around the periphery of said article.

2. The method of claim 1 wherein said backing comprises a generally closed cell thermoplastic material.

3. The method of claim 1 wherein said backing comprises a generally non-porous plastic.

4. The method of claim 1 wherein said backing is a foamed alkenyl aromatic resin and said skin is an alkenyl aromatic resin film.

5. The method of claim 1 wherein said backing is foamed polystyrene and said skin is polystyrene film.

6. The method of claim 5 wherein said foamed polystyrene has an average cell size of from about 0.1 to 10 millimeters and said polystyrene film has a thickness of from about 5 to 20 mils.

7. The method of claim 1 wherein said backing is foamed polyethylene and said skin is polyethylene film.

8. The method of claim 1 wherein said backing is foamed polyvinyl chloride and the film is polyvinyl chloride film.

9. The method of claim 1 wherein the heat used to shrink said surface cells is substantially that radiating from said skin when the latter is brought adjacent said surface cells.

References Cited in the file of this patent

UNITED STATES PATENTS

| | | |
|---|---|---|
| 2,722,719 | Altstadter | Nov. 8, 1955 |
| 2,931,495 | Stratton | Apr. 5, 1960 |

FOREIGN PATENTS

| | | |
|---|---|---|
| 555,219 | Canada | Apr. 1, 1958 |